(12) United States Patent
Oh

(10) Patent No.: US 7,838,091 B2
(45) Date of Patent: Nov. 23, 2010

(54) AROMATIC POLYAMIDE, POLYMERIZATION METHOD THEREOF, AND OPTICAL FILM USING THE SAME

(75) Inventor: Tae-Jin Oh, Daegu (KR)

(73) Assignee: Kyung-Pook National University Industry-Academic Cooperation Foundation (KR)

( * ) Notice: Subject to any disclaimer, the term of this patent is extended or adjusted under 35 U.S.C. 154(b) by 0 days.

(21) Appl. No.: 12/445,408

(22) PCT Filed: Oct. 9, 2007

(86) PCT No.: PCT/KR2007/004910

§ 371 (c)(1),
(2), (4) Date: Apr. 13, 2009

(87) PCT Pub. No.: WO2008/044851

PCT Pub. Date: Apr. 17, 2008

(65) Prior Publication Data

US 2010/0036085 A1   Feb. 11, 2010

(30) Foreign Application Priority Data

Oct. 13, 2006   (KR)   .................... 10-2006-0100018

(51) Int. Cl.
*C08G 69/32* (2006.01)
*C08J 5/18* (2006.01)
(52) U.S. Cl. .................... 428/1.25; 528/335; 528/348; 528/340
(58) Field of Classification Search ............ 528/340, 528/342, 329.1, 335, 336, 347, 348
See application file for complete search history.

(56) References Cited

U.S. PATENT DOCUMENTS

| | | | | |
|---|---|---|---|---|
| 5,097,015 A | * | 3/1992 | Miess et al. | 528/331 |
| 5,331,081 A | | 7/1994 | Dubal et al. | |
| 5,728,799 A | * | 3/1998 | Oh | 528/310 |

FOREIGN PATENT DOCUMENTS

| | | |
|---|---|---|
| JP | 7-276591 | 10/1995 |
| JP | 9-121077 | 5/1997 |
| JP | 2000-309074 | 11/2000 |
| JP | 2004-205569 | 7/2004 |
| JP | 2004-250569 | 9/2004 |
| JP | 2005-298590 | 10/2005 |
| JP | 2005-298749 | 10/2005 |
| JP | 2005-300722 | 10/2005 |
| WO | 94/24191 | 10/1994 |
| WO | 2005/018891 | 3/2005 |

OTHER PUBLICATIONS

International Search Report for PCT/KR2007/004910 dated Jan. 18, 2008.

* cited by examiner

*Primary Examiner*—Randy Gulakowski
*Assistant Examiner*—Rachel Kahn
(74) *Attorney, Agent, or Firm*—Cantor Colburn LLP

(57) ABSTRACT

A novel aromatic polyamide compound, a polymerization method thereof, and an optical film for use in a flexible display substrate produced using the same are disclosed. The aromatic polyamide compound is a copolymer comprising a repeating unit of a para-substituted aromatic diamine and a repeating unit of a meta- or meta-para-substituted aromatic diamine. The aromatic polyamide compound is colorless and transparent, excellent in heat resistance, and excellent in processability such as the compound being easily dissolved in a polar organic solvent without the addition of an inorganic salt. Therefore, the aromatic polyamide compound is suitable for producing the optical film for use in a display substrate.

10 Claims, No Drawings

AROMATIC POLYAMIDE, POLYMERIZATION METHOD THEREOF, AND OPTICAL FILM USING THE SAME

TECHNICAL FIELD

The present invention relates to an aromatic polyamide compound, a polymerization method thereof, and an optical film produced using the same, and more particularly to a novel aromatic polyamide compound suitable for producing an optical film, because the compound is colorless and transparent, excellent in heat resistance, and excellent in processability such as the compound being easily dissolved in a polar organic solvent without the addition of an inorganic salt, a method for polymerizing the compound, and an optical film produced using the compound.

BACKGROUND ART

LCDs that lead the display industry at present and OLEDs (organic light emitting diode) that rise as a popular display device of next generation have established techniques of using a conventional glass as a substrate material and forming transparent electrodes thereon. However, in recent years, active researches have been conducted for realizing so called a flexible display which uses a polymer film as a substrate.

However, when using electrode materials such as the conventional ITOs used for forming transparent electrodes on a glass substrate, the electrode formation is performed through a heat treatment at a high temperature of at least 180° C., and preferably 200° C. or higher for several minutes to 20 to 30 minutes. Thus, it is necessary to develop a polymeric material that has both colorless transparency and heat resistance as a flexible substrate material.

Meanwhile, an aromatic polyamide compound has high strength, high elasticity, high heat resistance, insulating properties, and low moisture and gas permeability. Thus, it is used as a material in the electric and electronic field such as a high performance magnetic tape for storing digital data or a flexible print circuit substrate.

However, mostly known para-substituted aromatic polyamides have very low solubility in a solvent. Thus, in order to dissolve the compound in a polar organic solvent, a fair amount of inorganic substance (LiCl or $CaCl_2$) is added. This inorganic substance must be removed from the film in a subsequent wet process, thus the processing process becomes complicated.

Moreover, a yellow or brown coloration may occur by the electron transfer between a benzene core and an amide group. Therefore, such a film does not satisfy the requirements as an optical material in the field of an optical communication, a display, or the like.

Moreover, there have been patents and researches reported in relation to polyimide-based aromatic polyimide films and the production methods thereof having a low coloration (YI of about 7) and high transparency.

However, these films are expensive or the coloration problem has not been solved sufficiently. Thus, they have not reached the point of commercialization.

DISCLOSURE

Technical Problem

Therefore, the present invention has been made in view of the above problems, and it is an object of the present invention to provide a novel aromatic polyamide compound which has inherent excellent physical properties such as heat resistance, is suitable for an optical material due to the compound being colorless and transparent, and has excellent processability since the compound easily dissolves in a polar organic solvent without the addition of an inorganic salt.

It is another object of the present invention to provide an optical film for use in a display substrate using the aromatic polyamide compound which does not generate break or craze when wrinkles are applied to the film by folding with hands, and which has excellent heat resistance and transparency, and merely no coloration.

Technical Solution

In accordance with an aspect of the present invention, the above and other objects can be accomplished by the provision of an aromatic polyamide compound which is a copolymer comprising repeating units represented by the formula I and formula II.

[Formula 1]

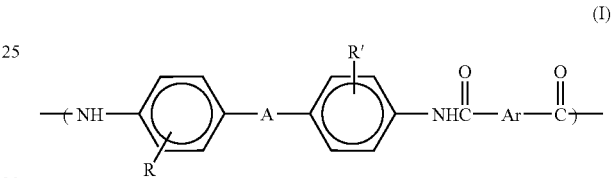

wherein, A is —SO—, —$SO_2$—, —$CH_2$—, —$CF_2$—, —$C(CH_3)_2$—, —$C(CF_3)_2$—, —CONH—, or —NHCO—, R and R' are each independently —H, —F, —Cl, —I, —$NO_2$, —CN, alkoxy having 1 to 4 carbon atoms, or —$CF_3$ and may be identical to or different from each other, and Ar is a benzene ring or a naphthalene ring in the meta- or para-position.

[Formula 2]

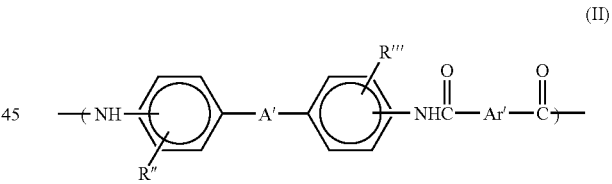

wherein, A' is —CONH— or —NHCO—, which is in the meta-meta- or meta-para-position with respect to an amine group, R'' and R''' are each independently any one from —H, —F, —Cl, —I, —$NO_2$, —CN, alkoxy having 1 to 4 carbon atoms, or —$CF_3$, may be identical to or different from each other and also may be identical to or different from R and R', and Ar' is a benzene ring or a naphthalene ring in the meta- or para-position and may be identical to or different from Ar.

In the repeating unit represented by the formula I using the para-substituted aromatic diamine, the A having no electron donor property as described above must be used to prevent coloration. Among these, —$SO_2$—, —$CF_2$—, or —$C(CF_3)_2$—, which functions to accept electrons, is particularly preferable.

The repeating unit represented by the formula I using the para-substituted aromatic diamine exhibits excellent heat resistance, coloration and transmittance. However, it decreases the solubility of the compound in polar organic solvents, resulting in the deterioration of the dope stability. Thus, in order to improve the solubility, an appropriate amount of the repeating unit represented by the formula II derived from the meta- or meta-para-substituted aromatic diamine is also included in the compound in a form of a copolymer.

In the repeating unit represented by the formula II, A' is —CONH— or —NHCO—, and it is more preferable that any one of the substituents R" or R'" includes a polar substituent such as —F, —Cl, —I, —NO$_2$, or —CN.

A content ratio of the repeating units represented by the formula I and formula II is not particularly limited. Although the repeating unit represented by formula II improves solubility of the aromatic polyamide copolymer in polar organic solvents, it deteriorates heat stability to some extent such that a yellowing is generated at high temperatures. Thus, it is preferable that the repeating unit represented by the formula II is contained in a relatively smaller amount than the repeating unit represented by the formula I. That is, depending on the type of A' and the type of a substituent, it is preferable that the repeating unit represented by the formula II is contained in an amount of 5 to 50% by mole based on the total repeating units. When the content exceeds the above range, the heat resistance is deteriorated, and the yellowing can be generated. Moreover, when the content is less than the above range, the solubility is low, thereby reducing the processability.

In accordance with another aspect of the present invention, there is provided a method for polymerizing an aromatic polyamide copolymer compound, wherein the polymerization is carried out by the copolycondensation of an aromatic dicarboxylic acid chloride represented by the following formula III or IV and a para-substituted aromatic diamine represented by the formula V and a meta-meta- or meta-para-substituted aromatic diamine represented by VI.

[Formula 3]

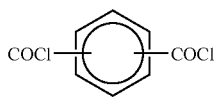

(III)

[Formula 4]

(IV)

[Formula 5]

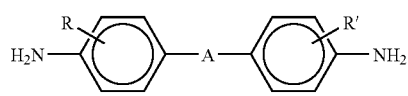

(V)

[Formula 6]

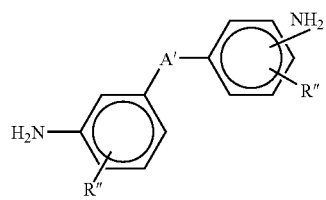

(VI)

Here, preferable examples of the para-substituted aromatic diamine represented by the formula V include 4,4'-diaminodiphenylsulfone (44DDS) represented by the following formula VII, and examples of the meta-para-substituted compound represented by the formula VI include 4,3'-diamino-2-cyanobenzanilide (34DACYB) represented by the following formula VIII.

[Formula 7]

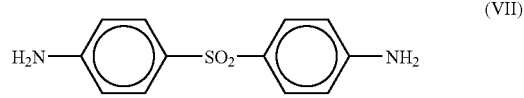

(VII)

[Formula 8]

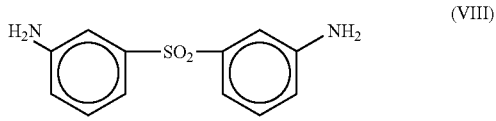

(VIII)

The copolymerization can be carried out by a solution condensation of diamine and dicarboxylic acid. That is, the meta- or para-substituted aromatic dicarboxylic acid chloride represented by the formula III or IV, and a mixture of the para-substituted aromatic diamine represented by V and the meta- or meta-para-substituted aromatic diamine represented by VI are prepared in the same mole ratio. The dicarboxylic acid and the diamine mixture were subjected to the solution condensation in a polar organic solvent, e.g., dimethylacetamide (DMAc), at a temperature of 0 to 50° C. for 1 minute to 24 hours to obtain the aromatic polyamide copolymer compound according to the present invention comprising the repeating units of the formulas I and II.

In accordance with yet another aspect of the present invention, there is provided an optical film for use in a display substrate produced by dissolving an aromatic polyamide copolymer compound comprising repeating units represented by the formula I and formula II in a polar organic solvent to prepare a dope, and molding and drying the dope into a film, wherein the film has a yellowness index (YI) of 10 or less, preferably 7 or less, based on a film thickness of 80±20 μm, and the film after the heat treatment at 250° C. for 30 minutes, also has a YI of 10 or less, and preferably 7 or less.

In general, when the film has a YI of about 3 or less, there is approximately no coloration shown with naked eyes. When the YI is 7 or less, there is coloration to some extent, but the film can be used as an optical film for display. Further, when the YI exceeds 10, there is an excessive coloration, thus the film is not suitable for use in the display substrate material.

The optical film according to the present invention maintains a YI of 7 or less even after being subjected to the heat treatment at a high temperature of 250° C. for about 30 minutes. There is also no change in the transmittance. Therefore, the optical film is suitably utilized as a flexible substrate material for display of LCDs, OLEDs, or electronic papers that need to be subjected to the heat treatment with high temperatures during the process of forming transparent electrodes such as ITOs.

Advantageous Effects

The aromatic polyamide copolymer compound according to the present invention maintains inherent excellent physical properties such as a heat resistance, is suitable as an optical material due to its colorless and transparent nature, and has excellent processability, since the compound is easily dissolved in a polar organic solvent without the addition of an inorganic salt. Therefore, the optical film using the compound has toughness of not generating break or craze when wrinkles are applied to the film by folding with hands, has excellent heat resistance and transparency, and has an advantage of having merely no coloration.

BEST MODE

The present invention will be described in a greater detail with reference to Examples.

Examples 1 to 3

Polymerization of Aromatic Polyamide

While stirring 200 ml of dimethylacetamide (DMAc) in a 500 ml-reactor under the flow of $N_2$, 19.466 g of 4,4'-diaminodiphenylsulfone (44DDS) (0.0784 mol, 70 mol %) and 8.468 g of 4,3'-diamino-2-cyanobenzanilide (34DACYB) (0.0366 mol, 30 mol %) were added and dissolved completely. The solution was cooled to 5° C., and 11.369 g of isophthaloyl chloride (IPC) (0.056 mol) was added into the reactor and stirred therewith. While carrying out the reaction, when the reaction solution temperature was elevated to 30° C., the solution was again cooled to 5° C. Then, 11.37 g of IPC (0.056 mol) was further added into the reactor, and the resulting solution was stirred vigorously. As the reaction progressed, the solution temperature was again elevated to 30° C., and after about 10 minutes, the viscosity of the reaction solution increased rapidly to obtain a highly cohesive polymer solution. The product obtained by continuing the polymerization at this temperature for 24 hours was poured into an excessive amount of water and solidified. The solid substance was collected by filtration, grinded, and then washed with water. The resulting substance was neutralized with an aqueous ammonium solution. Then, the mixture was again washed with water, methanol, and acetone, in this order. The polymer obtained by filtration was dried in a vacuum oven at 100° C. to obtain an aromatic polyamide sample 1 (poly(44DDS/34DACYB/IPC)). The obtained polymer had a yield of 99%.

Production of Aromatic Polyamide Film 5.994 g of the aromatic polyamide sample 1 obtained through the above polymerization process was added to 27.3 g of DMAc. The mixture was stirred at room temperature until the aromatic polyamide sample completely dissolved in DMAc to prepare a colorless and transparent dope with a concentration of 18 wt %. A portion of the dope was stored separately in a sealed container to check the storage stability. The remaining dope was applied onto three glass plates. The coated glass plates were put into a hot air dryer at 85° C. for 1 hour and dried. After evaporating the solvent, the plates were dried for 30 minutes at temperatures in the order of 100° C., 150° C., 200° C., 230° C., and 250° C. At every point of completing the dry at 200° C. (Example 1), 230° C. (Example 2), and 250° C. (Example 3), one sample was taken out and cooled. The film was separated from the glass plate to obtain an aromatic polyamide film according to the present invention.

Tests on the Aromatic Polyamide Film

The aromatic polyamide films produced in the above (Examples 1 to 3) had their thicknesses measured, respectively. The transmittance at 400 nm, 440 nm, and 500 nm and YI were measured, and the results are presented in Table 1.

The measurement of the transmittance and YI in this Examples, the other Examples, and Comparative Examples were carried in the following conditions.

Transmittance (%)

Transmittance of each film obtained in Examples and Comparative Examples was measured using Datacolor SF 600 PLUS™ Spectrophotometer and D65 as a light source.

Yellowness Index (YI)

YI of each film obtained in Examples and Comparative Examples was measured by the transmittance measurement method according to standard ASTM E313 using SF 600 PLUS™ Spectrophotometer.

Examples 4 to 8

Aromatic polyamide samples and aromatic polyamide films using the same were prepared respectively under the same conditions of Example 1, except that the type and content of aromatic diamines were changed as listed in Table 1. YI, and more were measured on the obtained films, and the results are presented in Table 1.

Comparative Examples 1 to 7

Aromatic polyamide samples and aromatic polyamide films using the same were prepared respectively under the same conditions of Examples 1 to 3, except that the type and content of aromatic diamines were changed as listed in Table 1. YI, and more were measured on the obtained films, and the results are presented in Table 1.

Comparative Examples 8 to 10

Aromatic polyamide samples and aromatic polyamide films using the same were prepared respectively under the same conditions of Example 1, except that the type and content of aromatic diamines were changed as listed in Table 1.

However, the aromatic polyamide sample obtained by the polymerization process during the production of the aromatic polyamide film was added to a 6 wt % LiCl/DMAc solution and dissolved with stirring to prepare a dope. After applying the dope onto a glass plate and drying at 85° C., the plate was immersed in water to remove LiCl completely. Then, the plate was again dried at 100° C. to obtain an aromatic polyamide film. From the obtained film, YI, and more were measured in the same manner, and the results are presented in Table 1.

Comparative Example 11

Using the commercially available polyethylene terephthalate (PET) film for OHP, a thickness, YI, and more were measured, and the results are presented in Table 1. Since the heat resistance of PET is readily known, the transmittance and YI were measured only on the samples before the heat treatment in the purpose to compare the coloration and transparency with the aromatic polyamide film of the present invention.

TABLE 1

| Classification | Types of Aromatice Diamine | Diamine Ratio (mol %) | Temperature for Heat Treatment | Thickness | Y.I. | Transmittance (%) | | | Storage Stability of Dope |
|---|---|---|---|---|---|---|---|---|---|
| | | | | | | 400 nm | 440 nm | 500 nm | |
| Comp. Ex. 1 | 44DDS | 100 | 230 | 71.4 | 2.6 | 83 | 85 | 87 | <1 day |
| Comp. Ex. 2 | 44DDS | 100 | 250 | 61 | 1.8 | 91 | 91 | 92 | |
| Comp. Ex. 3 | 34DACYB | 100 | 200 | 80 | 2.9 | 81 | 84 | 86 | >3 |
| Comp. Ex. 4 | 34DACYB | 100 | 220 | 81.5 | 7 | 70 | 80 | 85 | months |
| Comp. Ex. 5 | 34DACYB | 100 | 250 | 83.5 | 8.5 | 72 | 82 | 87 | |
| Ex. 1 | 44DDS/34DACYB | 70/30 | 200 | 74.9 | 2 | 82 | 86 | 87 | >3 |
| Ex. 2 | 44DDS/34DACYB | 70/30 | 230 | 73.4 | 2.5 | 80 | 85 | 86 | months |
| Ex. 3 | 44DDS/34DACYB | 70/30 | 250 | 82.6 | 3.7 | 76 | 83 | 86 | |
| Ex. 4 | 44DDS/34DACYB | 85/15 | 200 | 83.7 | 2.3 | 81 | 84 | 85 | <15 days |
| Ex. 5 | 44DDS/34DACYB | 85/15 | 230 | 96.8 | 2.7 | 81 | 84 | 86 | |
| Ex. 6 | 44DDS/34DACYB | 85/15 | 250 | 87.7 | 3.9 | 77 | 83 | 85 | |
| Ex. 7 | 44DDS/34DAB*[1] | 70/30 | 230 | 99.5 | 6 | 72 | 81 | 85 | >3 |
| Ex.. 8 | 44DDS/34DAB | 70/30 | 250 | 87.2 | 7 | 70 | 80 | 85 | months |
| Comp. Ex. 6 | 44DDS/MPD*[2] | 70/30 | 230 | 76.4 | 8.1 | 66 | 78 | 84 | >3 |
| Comp. Ex. 7 | 44DDS/MPD | 70/30 | 250 | 77.8 | 11.5 | 64 | 73 | 79 | months |
| Comp. Ex. 8 | MPD | 100 | 200 | 63.4 | 10.9 | 66 | 73 | 79 | Inorganic |
| Comp. Ex. 9 | MPD | 100 | 230 | 64.1 | 11.5 | 64 | 73 | 79 | salt must |
| Comp. Ex. 10 | MPD | 100 | 250 | 65.2 | 11.9 | 63 | 72 | 78 | be added for dissolving |
| Comp. Ex. 11 | PET | | PET | 136 | 2.61 | 85 | 86 | 88 | |

*[1]34DAB: 3,4'-diaminobenzanilide
*[2]MPD: meta-phenylenediamine

As shown in Table 1, it was exhibited that the aromatic polyamide films of Examples 1 to 8 according to the present invention had excellent transmittance and YI that were equal to PET. Moreover, it was known that the yellowing was not intense even after the heat treatment at 250° C. Further, it was confirmed that the process for processing the aromatic polyamide compounds into the films was simple and stable, because the compounds had relatively high solubility in polar organic solvents and high storage stability of the dopes.

On the other hand, the other aromatic polyamides of Comparative Examples 1 to 10 had problems in the stability of the processing, because the storage stability of the dope was less than one day (Comparative Examples 1 and 2), in rapid yellowing as the temperature increased (Comparative Examples 3 to 5), or in unsuitability for the application to optical films for use in a display substrate due to a high degree of self coloration (Comparative Examples 5 to 10).

INDUSTRIAL APPLICABILITY

The aromatic polyamide compound and the film using the same according to the present invention are useful for the production of an optical film that can be used as a substrate material for flexible displays, namely, flexible OLEDs, LCDs, or electronic papers. Especially, the aromatic polyamide compound according to the present invention is easily dissolved in a polar organic solvent without adding an inorganic salt and excellent in the storage stability of a dope solution. Thus, according to the present invention, an excellent optical film can be produced with a simple process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claim is:

1. An aromatic polyamide compound which is a copolymer comprising repeating units represented by the following formula I and formula II:

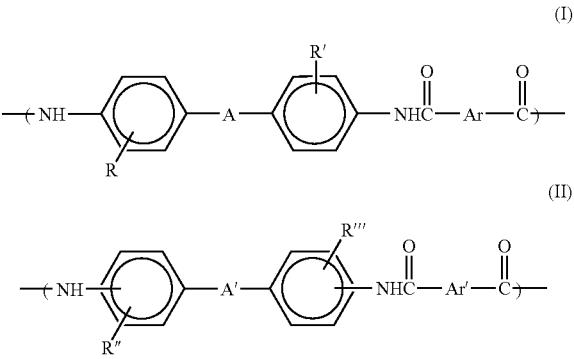

wherein, A is —$SO_2$—, —$CF_2$—, or —$C(CF_3)_2$—, A' is —CONH— or —NHCO—, which is in the meta-meta- or meta-para-position with respect to an amine group, R, R', R" and R'" are each independently any one of —H, —F, —Cl, —I, —$NO_2$, —CN, alkoxy having 1 to 4 carbon atoms, or —$CF_3$ and may be identical to or different from each other, at least one of the R" and R'" is a polar group selected from —F, —Cl, —I, —$NO_2$, and —CN, and Ar and Ar' are each independently a benzene ring or a naphthalene ring in the meta- or para-position and may be identical to or different from each other; and wherein the repeating unit represented by the formula II is contained in an amount ranging 15-50% by mole based on the total repeating units of the copolymer, and an optical film prepared from the aromatic polyamide compound has a YI of 10 or less, and a YI, after a heat treatment at 250° C. for 30 minutes, of also 10 or less for a film thickness of 60 to 100 μm.

2. A method for polymerizing an aromatic polyamide copolymer compound according to claim 1, wherein the polymerization is carried out by the copolycondensation of an aromatic dicarboxylic acid chloride represented by the following formula III or IV and a para-substituted aromatic diamine represented by the formula V and a meta-meta- or meta-para-substituted aromatic diamine represented by VI:

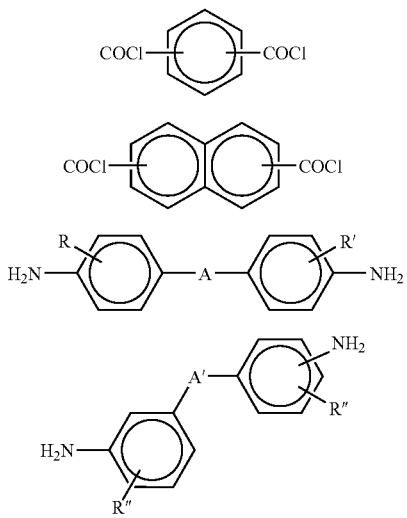

wherein, A is —SO$_2$—, —CF$_2$—, or —C(CF$_3$)$_2$—, A' is —CONH— or —NHCO—, which is in the meta-meta- or meta-para-position with respect to an amine group, R, R', R" and R'" are each independently any one of —H, —F, —Cl, —I, —NO$_2$, —CN, alkoxy having 1 to 4 carbon atoms, or —CF$_3$ and may be identical to or different from each other, at least one of the R" and R'" is a polar group selected from —F, —Cl, —I, —NO$_2$, and —CN, and —COCl groups of an aromatic dicarboxylic acid chloride are in the meta- or para-position in a benzene ring or a naphthalene ring.

3. The method according to claim 2, wherein the para-substituted aromatic diamine represented by the formula V is 4,4'-diaminophenylsulfone.

4. The method according to claim 3, wherein the meta-meta- or meta-para-substituted aromatic diamine represented by VI is 4,3'-diamino-2-cyanobenzanilide.

5. An optical film for use in a display substrate which is produced by molding and drying a dope including an aromatic polyamide comprising repeating units represented by the following formula I and formula II into a film:

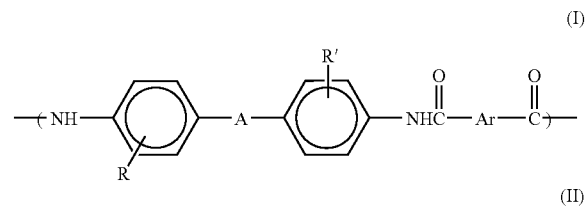

wherein, A is —SO$_2$—, —CF$_2$—, or —C(CF$_3$)$_2$—, A' is —CONH— or —NHCO—, which is in the meta-meta- or meta-para-position with respect to an amine group, R, R', R" and R'" are each independently any one of —H, —F, —Cl, —I, —NO$_2$, —CN, alkoxy having 1 to 4 carbon atoms, or —CF$_3$ and may be identical to or different from each other, at least one of the R" and R'" is a polar group selected from —F, —Cl, —I, —NO$_2$, and —CN, and Ar and Ar' are each independently a benzene ring or a naphthalene ring in the meta- or para-position and may be identical to or different from each other, wherein the repeating unit represented by the formula II is contained in an amount ranging 15-50% by mole based on the total repeating units of the copolymer, and the optical film has a YI of 10 or less, and a YI, after a heat treatment at 250° C. for 30 minutes, of also 10 or less for a film thickness of 60 to 100 μm.

6. The film according to claim 5, wherein the optical film has a YI of 7 or less, and a YI after a heat treatment at 250° C. for 30 minutes of also 7 or less.

7. The film according to claim 5, wherein the aromatic polyamide is dissolved in a polar organic solvent to prepare a dope.

8. The film according to claim 5, wherein the display substrate is a flexible display substrate.

9. The film according to claim 6, wherein the aromatic polyamide is dissolved in a polar organic solvent to prepare a dope.

10. The film according to claim 6, wherein the display substrate is a flexible display substrate.

* * * * *